(12) United States Patent
Kim et al.

(10) Patent No.: US 6,400,568 B1
(45) Date of Patent: Jun. 4, 2002

(54) METHOD AND APPARATUS FOR COOLING ELECTRONIC COMPONENTS

(75) Inventors: David K. J. Kim; William W. Ruckman, both of San Jose; Dimitry Struve, Palo Alto, all of CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/903,351

(22) Filed: Jul. 11, 2001

(51) Int. Cl.[7] ................................. H05K 7/20
(52) U.S. Cl. .................. 361/697; 361/690; 361/694; 361/695; 174/16.1; 174/16.3; 165/80.3; 165/104.33; 165/122; 454/184
(58) Field of Search ................. 361/690–695, 361/704; 174/16.1, 16.3; 165/80.2, 80.3, 104.33, 185; 454/184

(56) References Cited

U.S. PATENT DOCUMENTS

| | | | | |
|---|---|---|---|---|
| 5,871,396 A | * | 2/1999 | Shen | 454/184 |
| 5,936,836 A | * | 8/1999 | Scholder | 361/695 |
| 5,946,188 A | * | 8/1999 | Rochel et al. | 361/690 |
| 6,034,871 A | * | 3/2000 | Cheng | 361/695 |
| 6,215,659 B1 | * | 4/2001 | Chen | 361/695 |
| 6,236,564 B1 | * | 5/2001 | Fan | 361/695 |
| 6,244,953 B1 | * | 6/2001 | Dugan et al. | 454/184 |
| 6,297,444 B1 | * | 10/2001 | Chuang et al. | 174/17 VA |
| 6,302,189 B1 | * | 10/2001 | Lin et al. | 165/80.3 |

FOREIGN PATENT DOCUMENTS

JP  402128499 A  *  5/1990  ................. 361/695

* cited by examiner

Primary Examiner—Boris Chervinsky
(74) Attorney, Agent, or Firm—Williams, Morgan & Amerson

(57) ABSTRACT

The present invention discloses improved cooling designs and methods for the cooling of heat sources. One embodiment of the present invention is a cooling system comprising a housing and at least one divider disposed within the housing. The at least one divider creates a plurality of airflow channels through the housing. Another embodiment of the invention is a method for dissipating heat from heat sources within an electrical assembly comprising at least partially separating the heat sources with a divider. Separate airflow channels are created whereby the separated heat sources are disposed within the separated airflow channels. Forced airflow streams are generated through the separated airflow channels, thereby dissipating heat from the heat sources into the forced airflow streams.

11 Claims, 5 Drawing Sheets

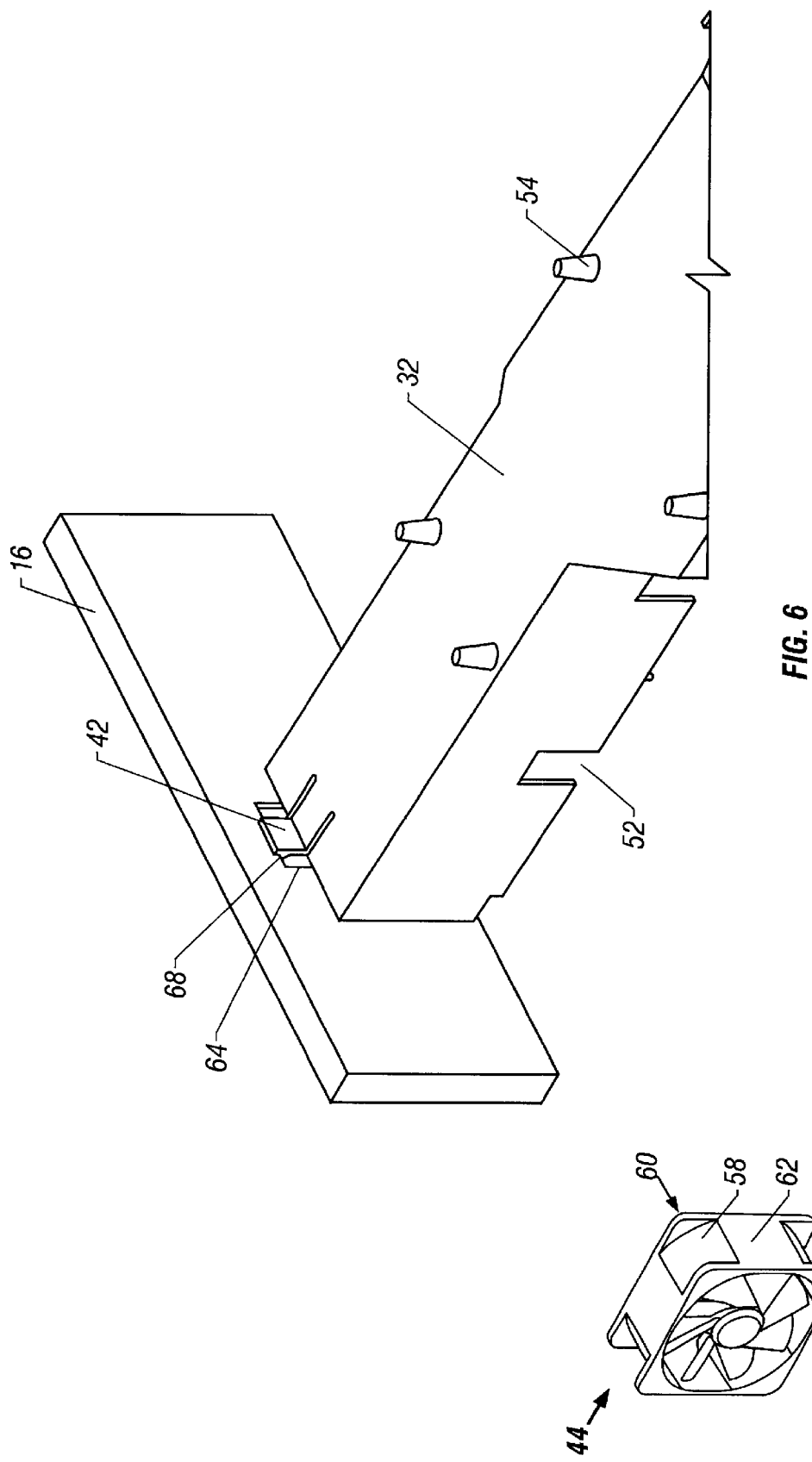

METHOD AND APPARATUS FOR COOLING ELECTRONIC COMPONENTS

BACKGROUND OF THE INVENTION

1. Field of the Invention

This invention relates generally to heat transfer, and, more particularly, to cooling assemblies and methods to remove at least some of the heat produced by a heat source, such as an electronic component.

2. Description of Related Art

Electronic components such as integrated circuits or semiconductor chips, hereafter referred to as "chips", are well known and commonly used in the art to perform electronic functions. When in use, the chips often produce significant levels of heat. To reduce the heat generated, the chip size needs to be decreased, which causes the heat to be concentrated into a smaller area. As technology has increased the capacity of the chips to perform functions, it has been found that the amount of concentrated heat produced has increased significantly. The increased level of heat produced by these chips can lead to a number of problems, for example, elevated levels of heat can potentially cause the chip to malfunction.

Various methods have been employed in the art to dissipate heat from chips. One method involves creating a forced airflow across the chip using a fan or blower. Another method involves mounting a heatsink on the surface of the chip. Heatsinks are typically manufactured from a metal having a high thermal conductivity, such as aluminum, and are mounted onto the surface of the chip to dissipate the heat produced by means of thermal conduction. Heatsinks typically comprise a plurality of parallel fins that are mounted on a base and which serve to facilitate the radiation and convection of the conducted heat by providing an increased surface area. Often a fan or blower will be used to provide a forced airflow across the heatsink fins to increase their heat transfer capacity.

The two most significant modes of heat transfer are heat conduction and heat convection. Heat conduction is the transfer of heat through a solid medium. Heat conduction can be through a single solid medium or can be from one solid medium to another adjacent solid medium. The transfer of heat is based on a temperature differential, i.e. heat flowing from a hot body to a cold body, until temperature equilibrium between the bodies is reached. Heat convection is the transfer of heat away from a hot solid medium to a cooler body of air. The air, typically ambient, has a generally constant temperature. Heat is convected away by air currents generated by the warming of the air near the hot solid medium, and/or by a forced flow of air past the hot solid medium. Both conduction and convection are useful in providing heat dissipation from electrical devices.

The network of heat transfer pathways through which heat flows determines the overall heat transfer characteristics and is a significant factor in the ability to adequately dissipate the generated heat. The subject area of heat generation and dissipation within a system is sometimes referred to as the thermal management of the electronic system. The heat is conducted away from the chip and through the various thermal pathways to reach an outer surface of the heatsink. The heat can then be convected away from the outer surface to the adjacent air mass.

As new semiconductor designs are becoming smaller and are capable of increased processing capacity, the amount of concentrated heat generated has increased dramatically. To compound the problem, high performance integrated circuit chips are often mounted in close proximity to other heat generating chips on a printed circuit board, and frequently the circuit board is itself disposed within a confined area of an electronic device. Chips located in close proximity to each other will act as secondary heat sources on each other by radiant heat transfer, thereby increasing the amount of heat dissipation needed, while at the same time elevating the air temperature surrounding the chips, which acts to restrict the rate of total heat transfer. The commonly used methods of cooling that are mentioned above have sometimes been found to be inadequate for cooling high performance electronic systems.

Another area of concern in heatsink design is airflow. As the package sizes for electronic systems get smaller, the more difficult it becomes to provide and direct an adequate airflow to the various heat sources and through the system. The problem of effective temperature control has become a major industry concern and resulted in an increased focus on thermal management within the electronic systems.

There exists a need for improved cooling system designs that can effectively dissipate heat away from semiconductor chips, integrated circuits and other related electronic components.

SUMMARY OF THE INVENTION

One embodiment of the present invention is a cooling system comprising a housing and at least one divider disposed within the housing. The at least one divider creates a plurality of airflow channels through the housing.

Another embodiment of the invention is a method for dissipating heat from heat sources within an electrical assembly comprising at least partially separating the heat sources with a divider. Separate airflow channels are created, whereby the separated heat sources are disposed within the separated airflow channels. Forced airflow streams are generated through the separated airflow channels, thereby dissipating heat from the heat sources into the forced airflow streams.

BRIEF DESCRIPTION OF THE DRAWINGS

The invention may be understood by reference to the following description taken in conjunction with the accompanying drawings, in which:

FIG. 5 shows a perspective view of a cooling fan embodiment that can be utilized with the present invention;

FIG. 6 shows a perspective view of an embodiment of a releasable housing connection.

Figure 1:
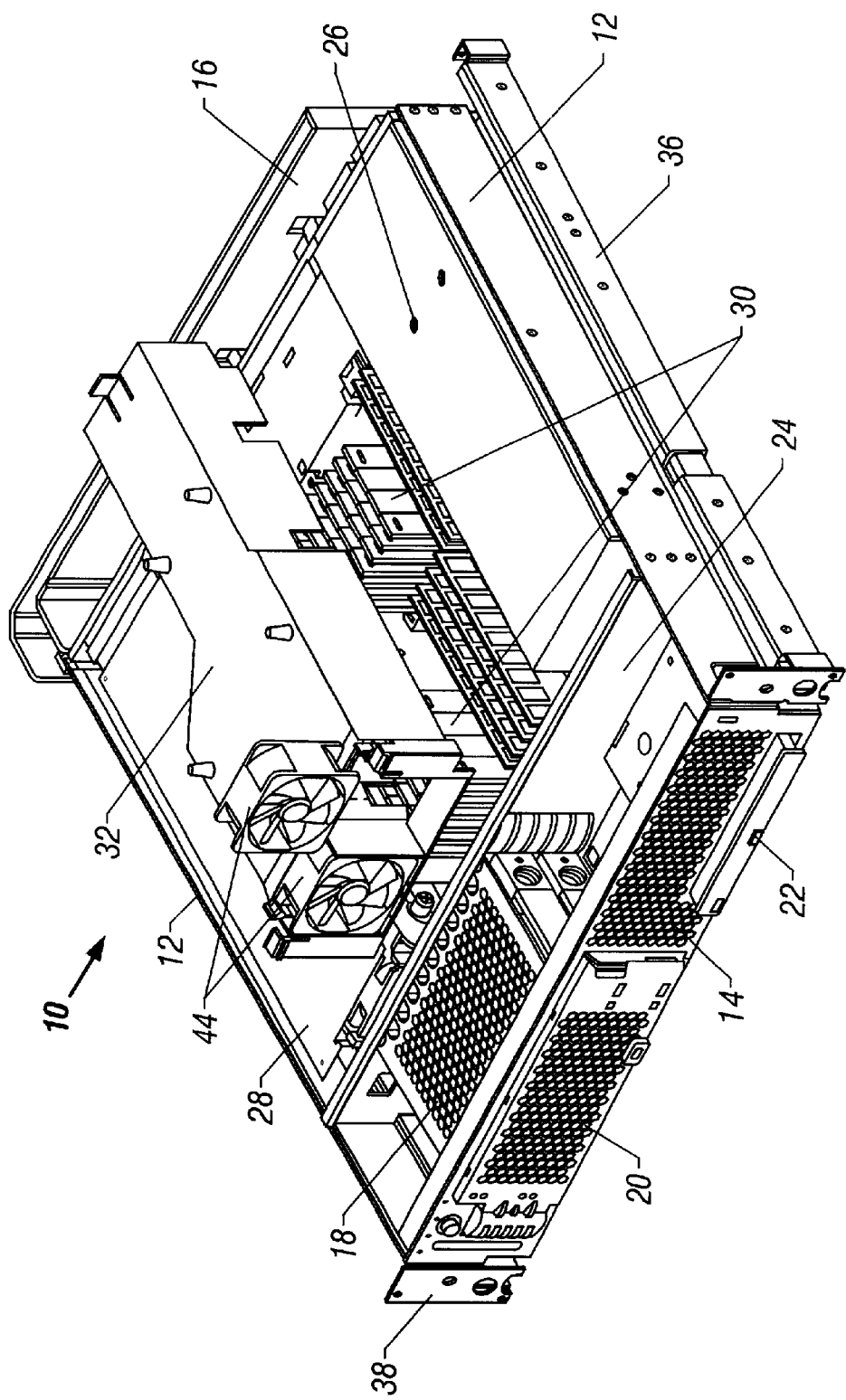
FIG. 1 shows a partially exploded top perspective view of the interior of an electronic assembly comprising an embodiment of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but, on the contrary, the intention is to cover all modifications, equivalents, and alternatives falling within the spirit and scope of the invention as defined by the appended claims.

DESCRIPTION OF ILLUSTRATIVE EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring to the attached drawings, FIG. 1 shows a partially exploded top perspective view of the interior of a computer assembly 10 comprising a chassis 12 with a front enclosure 14 and a rear enclosure 16. A removable device compartment 18 is shown having two hard disk drives 20 and a compact disk—read only memory (CD ROM) device 22 disposed within. A middle frame element 24 separates the removable device compartment 18 from a power supply 26, a peripheral component interface bus (PCI) riser assembly 28 and two central processing unit (CPU) assemblies 30. Within the present application, the term CPU will be used to refer to a central processing unit and to any heatsink elements that may be attached to the central processing unit. A CPU housing 32 partially encloses the CPUs 30 providing a partial separation between the CPUs 30, the power supply 26, and the PCI riser assembly 28. At a front end of the CPU housing 32 are two cooling fans 34 that provide a forced airflow within the CPU housing 32 to aid the CPU 30 heatsinks to dissipate the heat generated by the CPUs 30. The chassis 12 is attached to a sliding frame 36 that can move between a retracted position and an extended position. The sliding frame 36 enables the computer assembly 10 to be extended forward to allow access to the components located in the interior of the assembly 10. A retaining bracket 38 connected to the chassis 12 enables the computer assembly 10 to be secured with the sliding frame 36 to an external frame (not shown), when the computer assembly 10 is in its retracted position.

Within this application the term "computer assembly" can be used to refer to electronic assemblies, electronic devices and other multi-component systems in which the present invention can be used.

Figure 2:
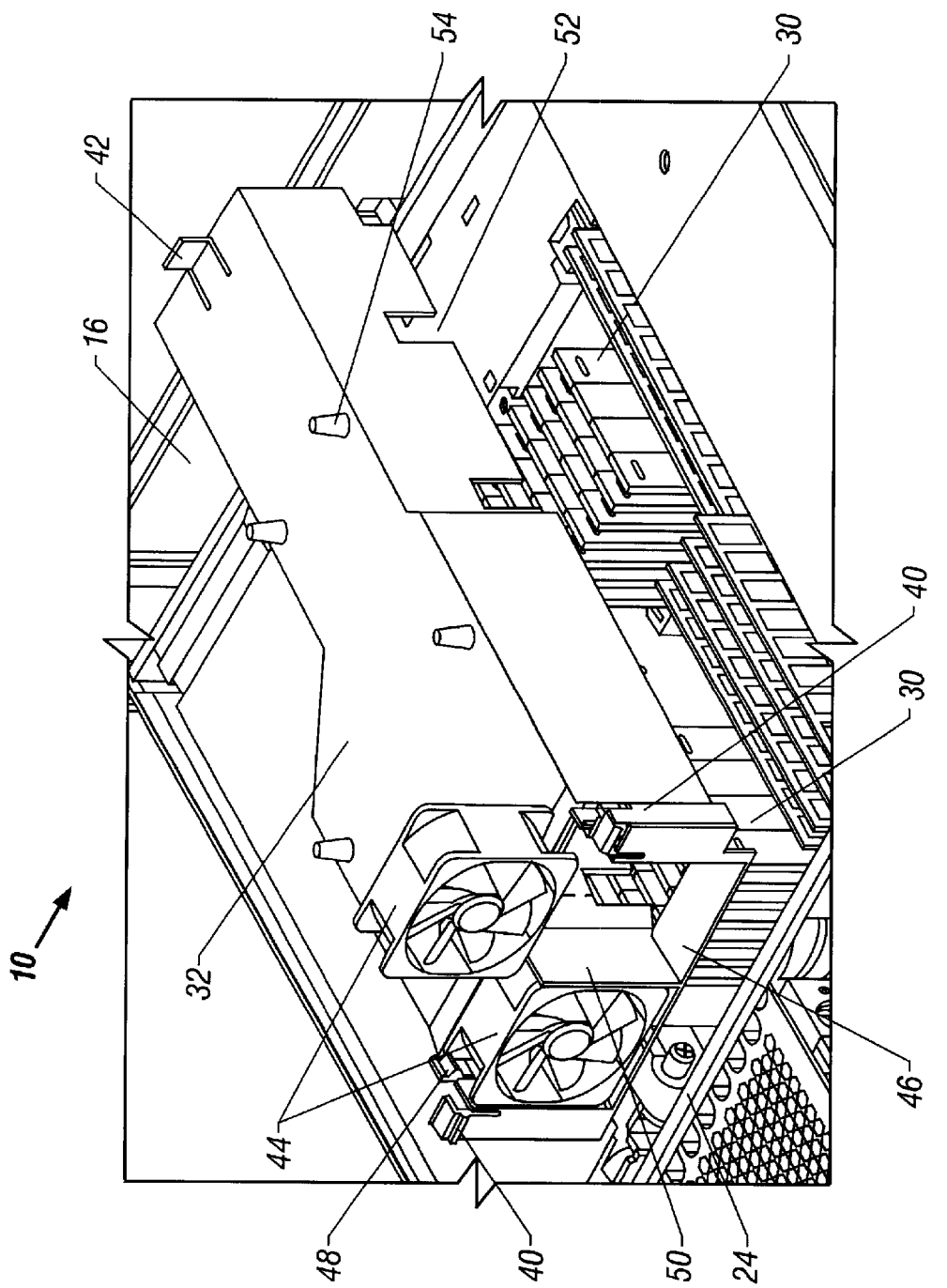
FIG. 2 shows an expanded view of a portion of the interior of the electronic assembly shown in FIG. 1.

FIG. 2 shows an expanded view of a portion of the computer assembly 10 including the rear enclosure 16, middle frame element 24, two CPUs 30, and the CPU housing 32. The CPU housing 32 comprises a pair of front latches 40 and a rear latch 42. The front latches 40 can be adapted to releasably engage with the middle frame element 24 while the rear latch 42 can be adapted to releasably engage with the rear enclosure 16. The latches 40, 42 can be designed for tool-less installation and removal. Conventional connection means that require the use of tools can also be used.

The term tool-less installation and removal means that the latches or retaining elements can be engaged and disengaged without the use of a tool, for example, a screwdriver or a wrench. The human hand of a person of ordinary dexterity can perform the installation and removal. Examples of latches and retaining elements that can provide tool-less installation and removal include flexible snaps and tabs and spring loaded retaining rings.

Two conventional fans 44 are disposed within fan housings 46, each fan housing 46 being attached to the CPU housing 32 or an integral part of the CPU housing 32. Each of the fans 44 is restrained within the fan housing 46 by means of a retaining element 48. The fan housing 46 and retaining element 48 can provide for tool-less installation and removal of the fans 44 within the fan housing 46. The fan 44 is capable of being inserted into the fan housing 46 by hand, the retaining element 48 being capable of movement to allow the fan to pass by. The retaining element 48 can be moved by hand or can be moved by contact with a surface of the fan 44 as it is inserted. In a similar manner the fan 44 can be removed by hand, again the retaining element 48 is moved by hand or by contact with a surface of the fan 44. Other retaining means can also be used which can require the use of tools to insert, retain and remove the fan 44 from the fan housing 46.

An air channel divider 50 can be located partially within the fan housing 46. The CPU housing can comprise openings 52 that serve as mechanical clearance cut outs for the CPU heatsink 30 attachment clips (not shown). The openings 52 can also allow a limited amount of airflow to pass through the walls of the CPU housing 32. The bulk of the airflow, on the other hand, passes through the fans 44, across the CPU heatsinks 30, and out the rear of the CPU housing 32. Spacers 54 can be located on a top surface of the CPU housing 32 to help retain and hold down the CPU housing 32 between the computer assembly 10 cover (not shown) and the motherboard (not shown) which the CPU assemblies 30 are attached. The spacers 54 along with the latches 40, 42 provide shock and vibration protection to the CPU housing 32.

The CPU housing 32 can be formed of any rigid material, for example, formed plastic, sheet metal such as aluminum or copper, and stiffened paper products.

Figure 3:
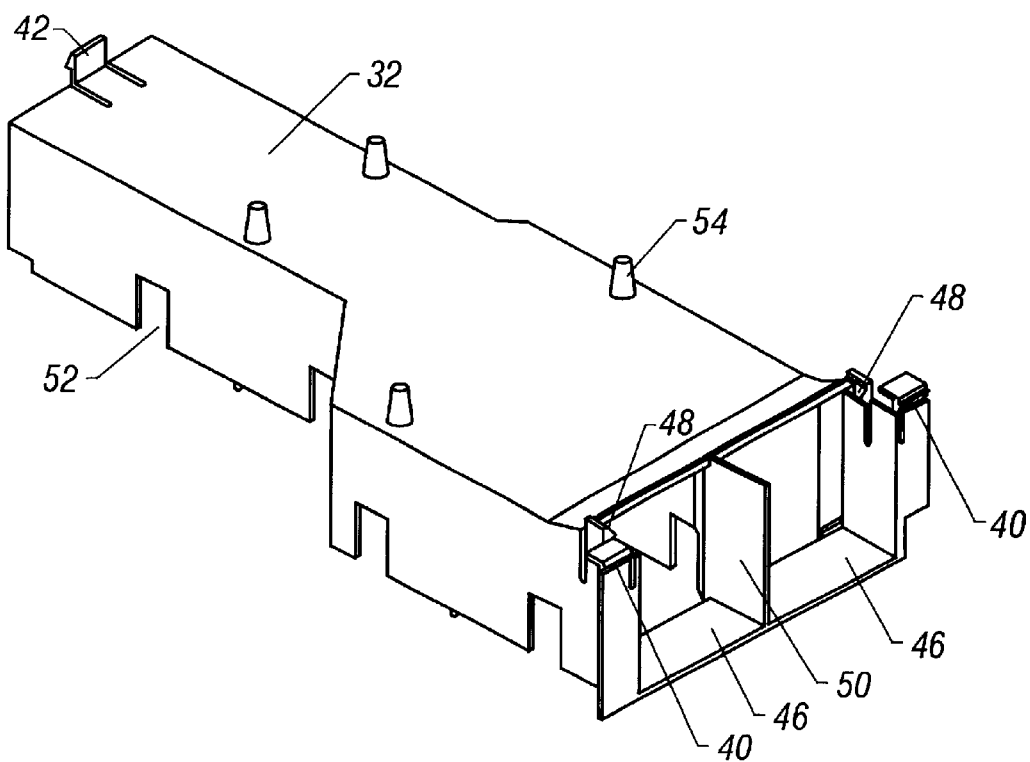
FIG. 3 shows a perspective view of the top and front of a CPU housing in one embodiment of the present invention.

FIG. 3 shows a perspective view of the top and front of a CPU housing 32, which also shows the fan housings 46 and a portion of the air channel divider 50. The front latches 40 and the rear latch 42 that can enable the tool-free installation and removal of the CPU housing 32 within the computer assembly are shown. Retaining elements 48 are located on the sides of the fan housing 46 and provide a means of holding the fans 44 within the fan housing 46.

Figure 4:
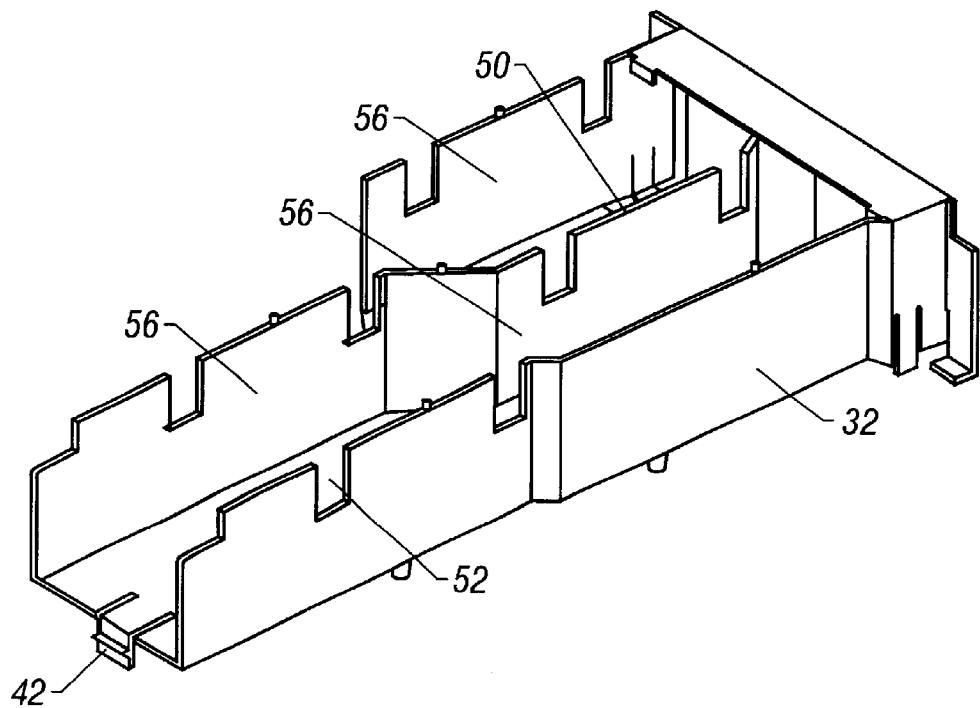
FIG. 4 shows a perspective view of the bottom and interior of the CPU housing in one embodiment of the present invention.

FIG. 4 is a view of the inside of the CPU housing 32 showing the air channel divider 50 which creates a plurality of air channels 56. The separate air channels 56 provide individual airflows to each of the CPUs 30, thus enabling increased heat dissipation from the separate heat sources.

FIG. 5 shows a perspective view of a cooling fan 44 embodiment that can be utilized with the present invention, the cooling fan 44 comprising contact surfaces 58 within the fan corners 60 that are sloped in relation to the fan sides 62. The sloped contact surface 58 comes in contact with the retaining element 48 (see FIG. 2) upon the installation and removal of the fan 44 from the fan housing 46. When force is exerted onto the fan 44 during installation and removal, the force is transferred through the contact surface 58 to the retaining element 48, this transferred force moves the retaining element 48 to a retracted position that permits the fan 44 to be installed or removed. Once the fan 44 is installed, the retaining element 48 returns via an urging from its leaf spring configuration to its un-retracted position and a portion of the retaining element 48 becomes located above the contact surface 58 of the fan 44, thus restricting the movement of the fan 44 within the fan housing 46.

FIG. 6 shows an embodiment of a releasable housing connection where a rear latch 42 releasably connected in a notch 64 in the rear enclosure 16. A projection 68 on the rear latch 42 is disposed within the recess of the notch 64, holding the housing 32 in place. The rear latch 42 is flexible enough so that the projection 68 can be extracted from the notch 64 by hand for easy removal of the housing 32 from the computer assembly 10. Similar releasable connections can be made for the front latches 40 attaching to the middle frame element 24.

Figure 7:
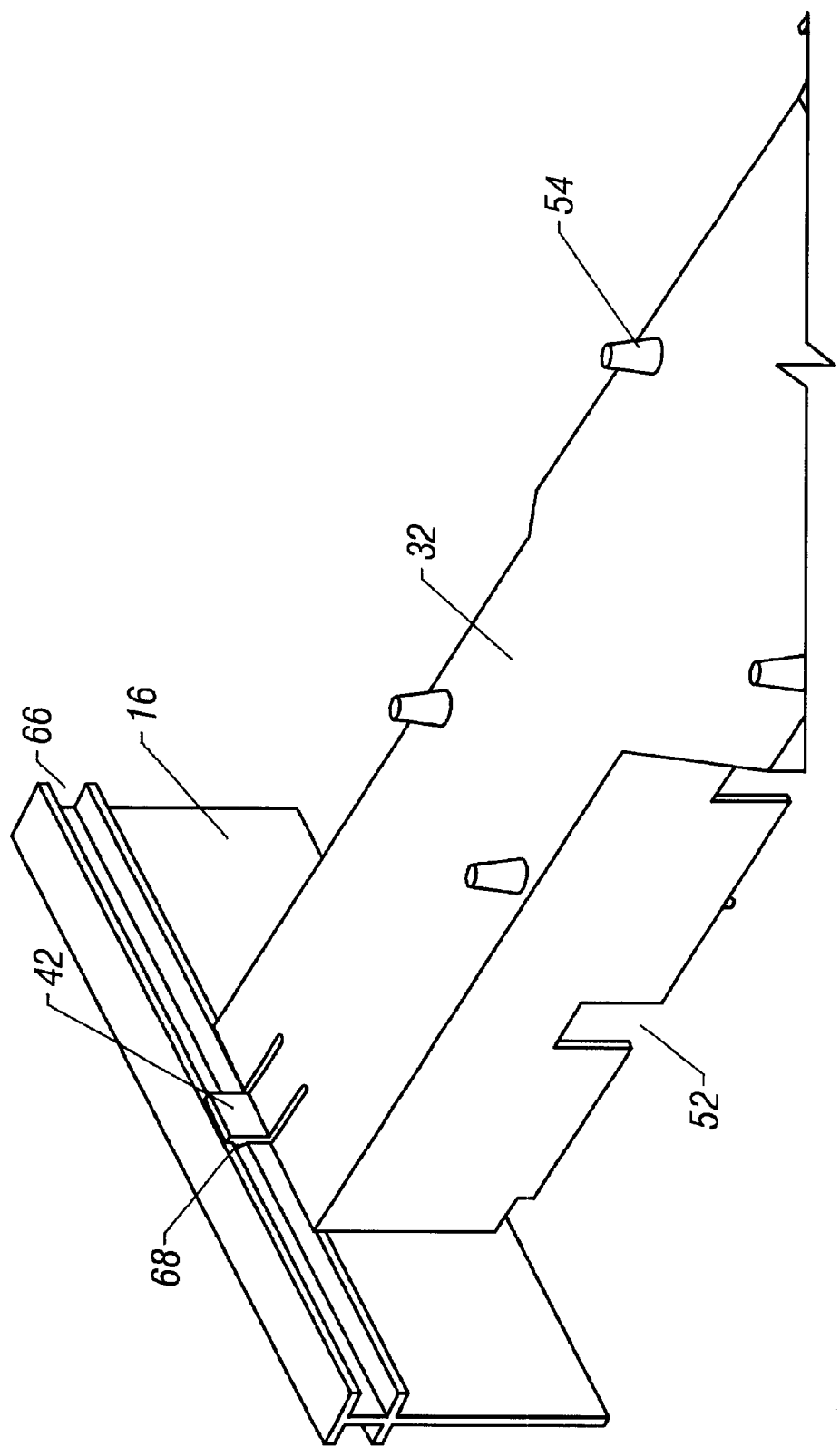
FIG. 7 shows a perspective view of an alternate embodiment of a releasable housing connection.

FIG. 7 shows another embodiment of a releasable housing connection where a rear latch 42 releasably is connected to a ledge 66 in the rear enclosure 16. A projection 68 on the rear latch 42 is disposed within the recess of the ledge 66, holding the housing 32 in place. The rear latch 42 is flexible enough so that the projection 68 can be extracted from the ledge 66 by hand for easy removal of the housing 32 from the computer assembly 10. Similar releasable connections can be made for the front latches 40 attaching to the middle frame element 24.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A cooling system, comprising:

a housing;

at least one divider within the housing, wherein the at least one divider creates a plurality of airflow channels through the housing;

at least one fan housing attached to the housing; and at least one fan disposed within the at least one fan housing, the at least one fan capable of creating a forced airflow through the housing;

wherein the plurality of airflow channels are capable of directing airflow onto one or more heat sources at least partially enclosed within at least one of the airflow channels;

wherein the at least one fan housing comprises at least one retaining element capable of retaining the at least one fan within the at least one fan housing.

2. The cooling system of claim 1, wherein the at least one fan is capable of being inserted and removed from the at least one fan housing without the use of a tool.

3. The cooling system of claim 1, wherein the housing further comprises at least one connector, and the housing is capable of attachment to an electronic assembly.

4. The cooling system of claim 3, wherein the housing is attached to the electronic assembly by the engagement of the at least one connector with the electronic assembly.

5. The cooling system of claim 4, wherein the at least one connector is capable of engaging to and disengaging from the electronic assembly without the use of a tool.

6. The cooling system of claim 4, wherein the housing is capable of attachment to and release from the electronic assembly without the use of a tool.

7. An improved heat dissipation system of the type used to cool heat sources within an electronic assembly, the system including a plurality of heatsinks and at least one fan, the fan creating a forced airflow; wherein the improvement comprises:

a housing comprising an internal divider, at least one opening within at least one wall of the housing, and at least one connector, the internal divider separating the plurality of heatsink and creating multiple channels within the housing, the at least one opening capable of allowing a limited amount of airflow to pass through at least one wall of the housing, and the at least one connector capable of engaging and disengaging the housing from the electronic assembly without the use of a tool;

a fan housing attached to the housing;

two fans disposed within the fan housing, each fan capable of creating a forced airflow into a separate channel within the housing; and at least one spacer protruding from an external surface of the housing, wherein the at least one spacer and the at least one connector are adapted to provide shock and vibration protection to the housing.

8. The improved heat dissipation system of claim 7, wherein the fan housing comprises at least one retaining element, the retaining element capable of retaining the at least one fan within the fan housing, and the at least one retaining element is capable of enabling the at least one fan to be inserted and removed from the fan housing without the use of a tool.

9. A cooling method for dissipating heat from heat sources within an electrical assembly, comprising:

providing a housing comprising at least one divider disposed within the housing, at least one opening within at least one wall of the housing, at least one spacer protruding from an external surface of the housing, and a fan housing, the at least one divider created plurality of airflow channels through the housing, the at least one opening capable of allowing a limited amount of airflow to pass through at least one wall of the housing, the at least one spacer and the at least one connector are adapted to provide shock and vibration protection to the housing, and the fan housing attached to a first end of the housing and in communication with the plurality of airflow channels;

attaching the housing to the electrical assembly whereby the at least one divider at least partially separates the heat sources within separate airflow channels;

inserting at least one fan within the fan housing;

energizing the at least one fan, thereby creating a forced airflow through the housing; and directing the forced airflow with the divider through the plurality of airflow channels so that separate airflow streams pass over the separated heat sources.

10. The cooling method of claim 9, wherein the housing is releasably attached to the electrical assembly by at least one connector, the connector capable of attaching and releasing from the assembly without the use of tools.

11. The cooling method of claim 9, wherein the fan is retained within the fan housing with at least one retaining element, the retaining element capable of enabling the fan to be inserted and removed from the fan housing without the use of a tool.

* * * * *